United States Patent [19]
Mohr et al.

[11] Patent Number: 6,012,491
[45] Date of Patent: Jan. 11, 2000

[54] PRESSURE ACCUMULATOR

[75] Inventors: Kurt Mohr, Halsenbach/Ehr; Karl-Friedrich Wörsdörfer, Budenheim; Gregor Poertzgen, Koblenz, all of Germany

[73] Assignee: Lucas Industries public limted company, Solihull, United Kingdom

[21] Appl. No.: 09/140,199

[22] Filed: Aug. 26, 1998

[51] Int. Cl.[7] .................................................. F16L 55/04
[52] U.S. Cl. .............................. 138/30; 138/26; 220/720
[58] Field of Search ................................ 138/30, 26, 31; 220/721, 720, 723; 303/113.2–113.4, 115.4

[56] References Cited

U.S. PATENT DOCUMENTS

| | | | |
|---|---|---|---|
| 1,830,869 | 11/1931 | Charles | 138/30 |
| 1,916,635 | 7/1933 | Pepper | 138/30 X |
| 1,932,666 | 10/1933 | Hyatt | 138/30 |
| 2,809,665 | 10/1957 | Crowe | 138/30 |
| 2,847,035 | 8/1958 | Peters | 138/30 |
| 3,415,277 | 12/1968 | Mitchell et al. | 138/30 X |
| 4,064,911 | 12/1977 | Albrecht | 138/30 |
| 4,813,477 | 3/1989 | Hansen et al. | 138/30 X |
| 4,858,898 | 8/1989 | Niikura et al. | 138/30 X |
| 4,880,147 | 11/1989 | Tolan | 138/30 X |
| 4,997,009 | 3/1991 | Niikura et al. | 138/30 |
| 5,655,569 | 8/1997 | Tackett | 138/30 |
| 5,682,923 | 11/1997 | Goloff et al. | 138/30 |

FOREIGN PATENT DOCUMENTS

| | | |
|---|---|---|
| 0391320 | 10/1990 | European Pat. Off. . |
| 3900899 | 7/1989 | Germany . |
| 3901261 | 7/1990 | Germany . |

*Primary Examiner*—Patrick Brinson
*Attorney, Agent, or Firm*—MacMillan, Schanski & Todd, LLC

[57] ABSTRACT

The invention relates to a pressure accumulator which comprises a housing for accommodating fluid, a fluid connection for a fluid flowing into and out of the housing, as well as a spring arrangement against whose force a fluid flowing through the fluid connection is acting, characterised in that at least one part of the spring arrangement is formed by at least one part of the wall of the housing.

4 Claims, 4 Drawing Sheets

PRESSURE ACCUMULATOR

The present invention relates to a pressure accumulator comprising a housing which forms a reservoir for fluid, a fluid connection for fluid flowing into and out of the housing, as well as a spring arrangement against whose force brake fluid flowing in through the fluid connection is acting.

From the state of the art pressure accumulators are known which are designed as gas piston accumulators, as gas diaphragm accumulators or as gas multilayer diaphragm accumulators or as spring piston accumulators. Such pressure accumulators are schematically depicted in FIGS. 1a, 1b, 1c and 1d, respectively. In the variants shown in FIGS. 1a to 1d the usable volume at 20° C. is identical. As is apparent, the respective size varies considerably. In addition, problems exist in the case of gas-filled pressure accumulators with respect to the temperature dependency and the tightness over the endurance performance. In the case of gas multilayer diaphragm accumulators, further drawbacks are their considerable weight and high costs. In the case of spring piston accumulators the problem exists in the wear of the seal between the cylinder and the piston.

The invention is based on the object to provide a pressure accumulator which does not have these drawbacks.

In order to solve this problem, at least one part of the spring arrangement is formed by at least one part of the housing wall.

In this manner, a considerable weight saving is achieved on the one hand. On the other hand, the integration of two functions (storage of potential energy and enclosing of the fluid) in a single component enables a considerable simplification of the overall arrangement. Moreover, seals which can wear due to friction are avoided.

The part of the spring arrangement which forms a part of the housing wall is preferably at least sectionally formed by bellows, preferably consisting of metal.

In order to obtain a pressure level which is as high as possible, a further part of the spring arrangement acts parallel to the spring arrangement which is formed by a part of the housing wall, which is preferably arranged inside the housing. This further part of the spring arrangement can be designed as a coil, elastomer or spiral spring or as a disk spring pack. There is also, however, the possibility to arrange the further part of the spring arrangement outside of the housing, for example, surrounding the housing.

Further advantages, properties and possible modifications will become apparent from the following description of the figures.

Figure 1C:
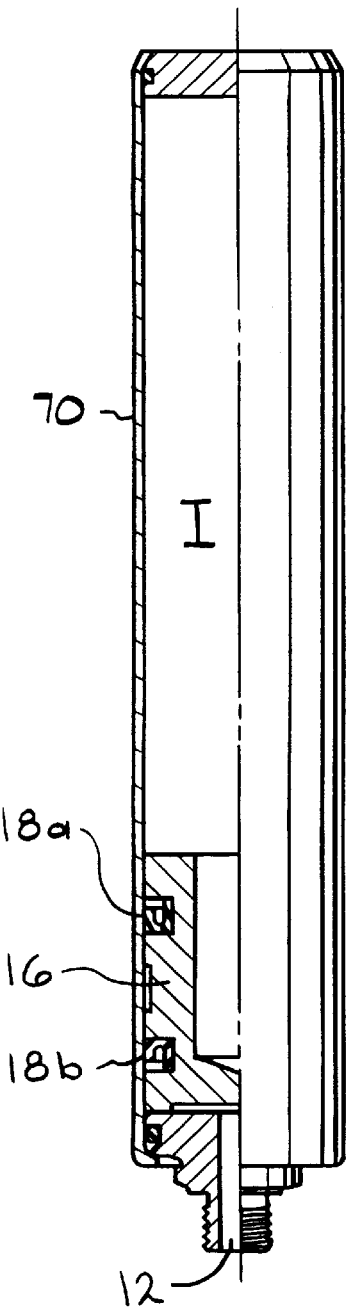
FIGS. 1a to 1d show different pressure accumulator variants according to the state of the art.
Figure 1A:
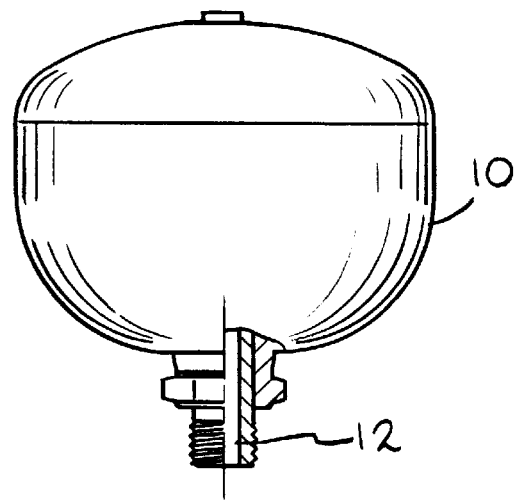

FIG. 1a shows a gas accumulator with a housing 10 which is divided into two compartments by a movable diaphragm (not shown). A first completely enclosed compartment I contains pressurised gas. A second compartment II can be subjected to pressurised fluid through a fluid connection. As soon as the pressure of the fluid applied to the fluid connection 12 is higher than the gas pressure in the first completely enclosed compartment I, the diaphragm is displaced so that this first compartment I is reduced in size and the fluid penetrates into the second compartment II.

Figure 1B:
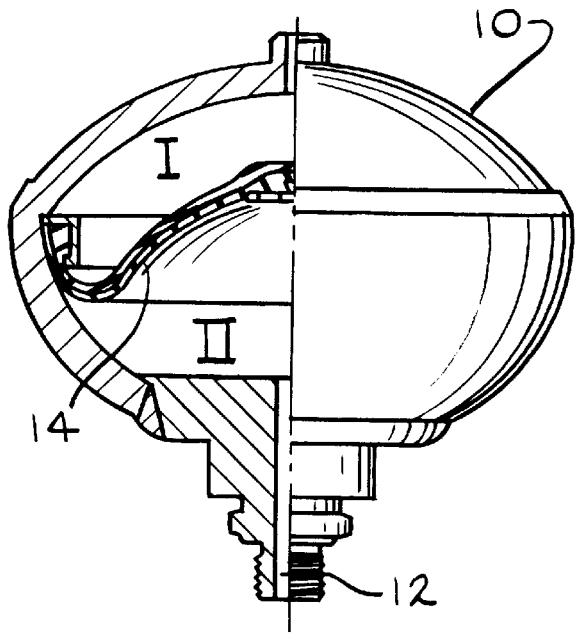

FIG. 1b shows a known pressure accumulator wherein the diaphragm is designed as a multilayer diaphragm 14. This multilayer diaphragm 14, however, is very expensive. However, it is able to at most double the life of the arrangement compared to an arrangement with a single-layer diaphragm.

The problems with respect to the temperature dependency are not solved therewith.

FIG. 1c shows a gas piston accumulator wherein a piston 16 is arranged in an axially movable manner within a cylinder which simultaneously forms the housing wall 10. The piston 16 encloses a compartment I which is filled with pressurised gas in the same manner as with the diaphragm 14. The problem with this arrangement is that under continuous operation the seals 18a, 18b are subject to the risk of wear and ageing. Moreover, in this case too, there is the problem of the temperature dependency due to the gas filling of the first compartment I.

Figures 1D, 1E:
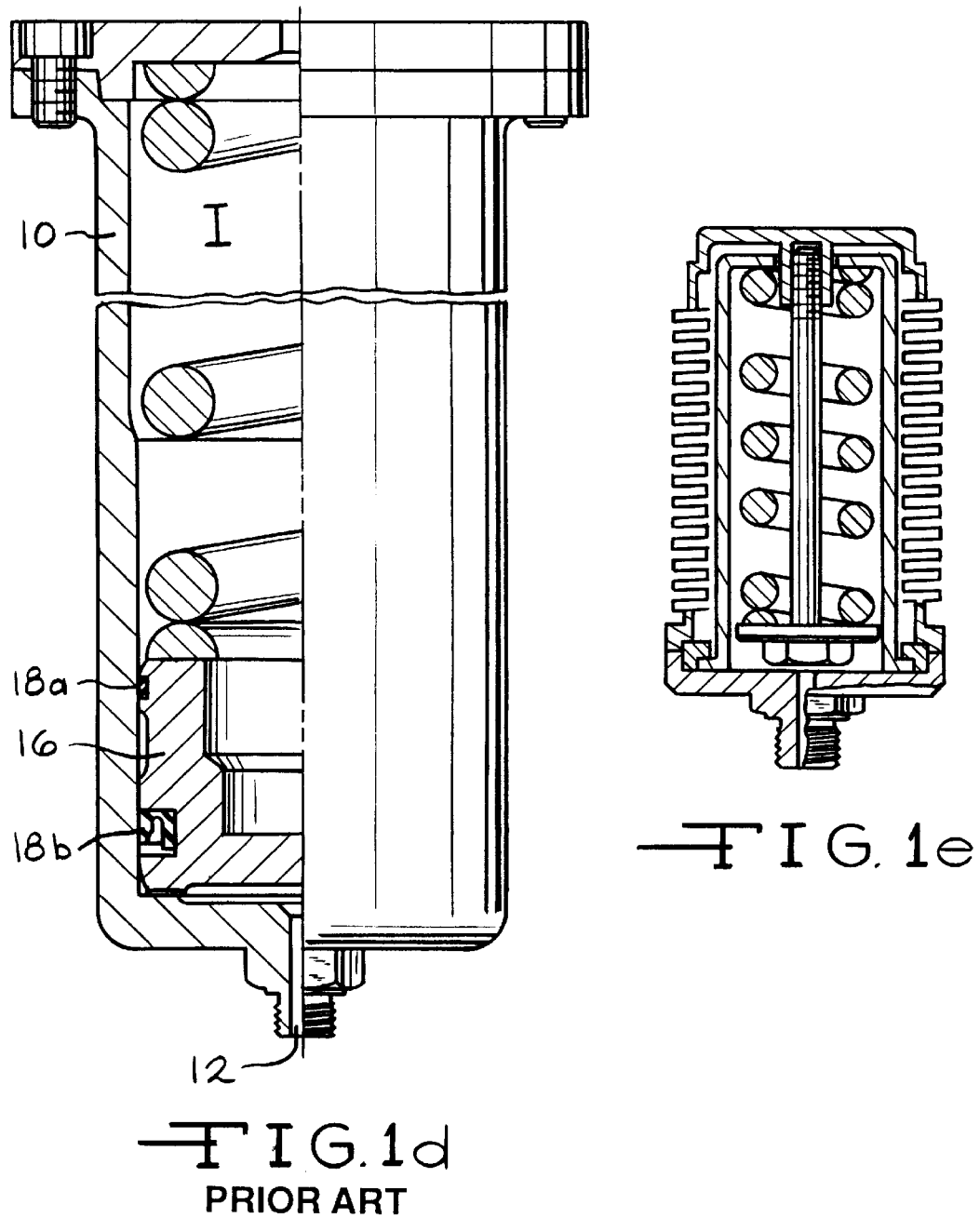
FIG. 1e shows an embodiment of the inventive pressure accumulator in a size comparison to scale with the known arrangements according to FIGS. 1a to 1d.

FIG. 1d shows a spring piston accumulator wherein a coil spring 20 is arranged in lieu of the gas filling, which bears on the piston 16. This, in fact, solves the problem of the temperature dependency. However, the problem of ageing and wear of the seals 18a, 18b still exists.

In addition, the drawings clearly show the considerable space requirement of the spring piston according to FIG. 1d, for example, as compared to the gas accumulator according to FIG. 1a.

Surprisingly, the inventive design makes it possible to achieve a space requirement which is only neglibly above the space requirement of the gas pressure accumulator according to FIG. 1a, with identical storage volumes for brake fluid being assumed. This is illustrated by the size comparison to scale between FIGS. 1a to 1d on the one hand and FIG. 1e (inventive pressure accumulator) on the other hand.

Nevertheless, the inventive pressure accumulator is not (or) hardly temperature-dependent and, due to the lack of moving seals, has no wear problems.

Figure 2:
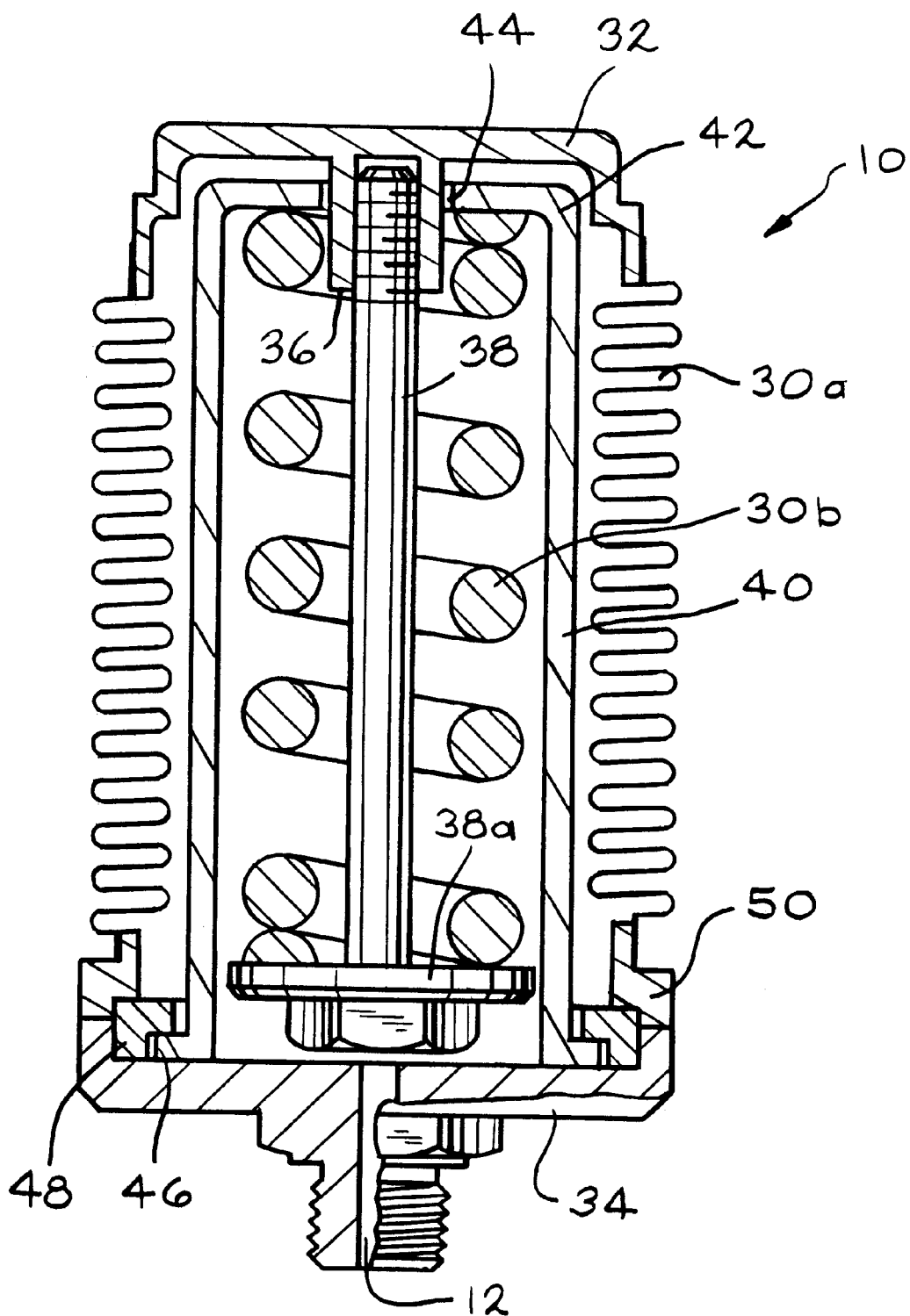
FIG. 2 shows an inventive pressure accumulator as an enlarged schematic representation.
Figure 3:
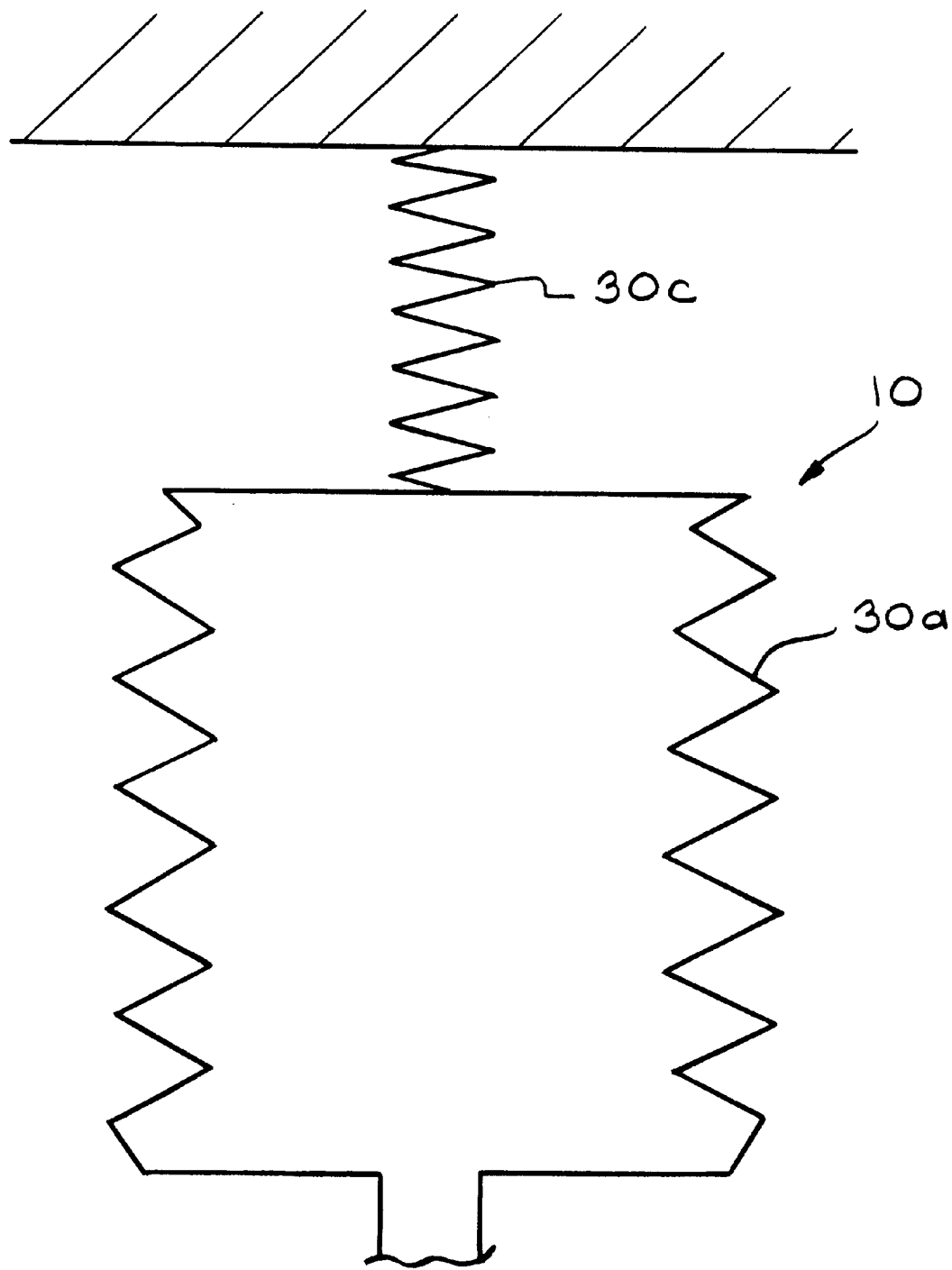
FIG. 3 shows a schematic representation of an alternative spring arrangement.

FIG. 2 shows an embodiment of an inventive pressure accumulator with a housing 10 for accommodating fluid, a fluid connection 12 for fluid flowing into and out of the housing 10 and a spring arrangement 30a, 30b, against whose force fluid flowing through the fluid connection acts. One part of the spring arrangement 30a, 30b is formed by a part of the housing wall of the housing 10. This part of the spring arrangement 30a, which forms a part of the housing wall, is formed by metal bellows. Inside the housing, a further part of the spring arrangement, i.e. the coil spring 30b, is connected so as to act parallel to same. A coil spring 30c outside the housing 10, as shown in FIG. 3, may be used in addition to or in substitution of the coil spring 30b inside the housing 10.

The housing 10 comprises two rigid wall sections 32, 34 which in the shown embodiment close the end faces of the cylindrical bellows. The fluid connection 12 is provided in the one wall section 34.

The two wall sections 32, 34 are firmly and pressure-tightly connected with both ends of the metal bellows 30a so that a totally closed compartment is obtained. The first rigid housing wall 32 is provided with a threaded flange 36 at its inside, into which a threaded bolt 38 is screwed. A tubular sleeve 40 bears against the second housing wall, whose axial length is dimensioned in such a manner that it essentially overlaps the entire space between the first and the second housing wall 32, 34. At its side facing towards the first housing wall 32 the sleeve 40 comprises a cover which serves as an intermediate wall 42 through which the threaded flange 26 protrudes so that it forms an annular gap 44. The spring element 30b is accommodated as a biased compression spring between the intermediate wall 42 and a head 38a of the threaded bolt 38. The bias of the spring element 30 can be adjusted by means of the threaded bolt 38.

At its side facing towards the second housing wall 34 the sleeve 40 comprises an outwardly facing annular collar 46 which is accommodated via a retaining ring 48 in the circumferential rim 50 of the second housing cover 34.

For installation, a preassembled unit consisting of the first housing wall 32 and the bellows 30a is inserted into the sleeve 40 (with the retaining ring 48) and the spring 30b fitted. The spring 30b is urged against the intermediate wall 32 by means of the threaded bolt 38. Subsequently, the second housing cover 34 is welded to the rim element 50 so that they form a strong connection capable of being subjected to pressure.

We claim:

1. A pressure accumulator comprising:

a housing for accommodating fluid;

a fluid connection for fluid flowing into and out of the housing; and a spring arrangement against whose force fluid flowing through the fluid connection is acting, at least one part of the spring arrangement being formed by at least one part of the wall of the housing and a further part of the spring arrangement acts parallel to the spring arrangement being formed by a part of the wall of the housing, at least one of the parts of the spring arrangement being adjustable biased in compression.

2. A pressure accumulator comprising:

a housing for accommodating fluid;

a fluid connection for fluid flowing into and out of the housing; and a spring arrangement against whose force fluid flowing through the fluid connection is acting, characterized in that at least one part of the spring arrangement is formed by at least one part of the wall of the housing and a further part of the spring arrangement acts parallel to the spring arrangement which is formed by a part of the wall of the housing, characterized in that the part of the spring arrangement which forms a part of the wall of the housing is at least sectionally formed by bellows and in that at least one of the parts of the spring arrangement is biased in compression and is adjustable.

3. A pressure accumulator comprising:

a housing for accommodating fluid, comprising two wall sections connected with a metal bellows;

a fluid connection for fluid flowing into and out of the housing; and a coil spring inside the housing, the bellows and the coil spring forming a spring arrangement against whose force fluid flowing through the fluid connection is acting, at least one of the wall sections being provided with a threaded flange into which a threaded bolt is threaded, a tubular sleeve bearing against the other wall section, the sleeve having an axial length that essentially overlaps the space between the wall sections, one side of the sleeve comprising a cover through which the flange protrudes, the coil spring being in compression between the head of the bolt and the cover, the compression of the coil spring being adjustable by the bolt.

4. The pressure accumulator according to claim 3, characterized in that a side of the sleeve opposite the cover comprises an outwardly facing annular collar, the wall section towards which the side of the sleeve having the annular collar faces has a circumferential rim for accommodating the annular rim and a retaining ring.

* * * * *